US007497377B2

(12) United States Patent
Watson

(10) Patent No.: US 7,497,377 B2
(45) Date of Patent: Mar. 3, 2009

(54) ELECTRONIC POLL REGISTER SYSTEM FOR ELECTIONS

(76) Inventor: David Watson, 3709 Foxford Cir., Tallahassee, FL (US) 32309

( * ) Notice: Subject to any disclaimer, the term of this patent is extended or adjusted under 35 U.S.C. 154(b) by 660 days.

(21) Appl. No.: 11/114,793

(22) Filed: Apr. 26, 2005

(65) Prior Publication Data

US 2006/0237535 A1 Oct. 26, 2006

(51) Int. Cl.
*G06K 17/00* (2006.01)

(52) U.S. Cl. ........................................ 235/386; 235/51

(58) Field of Classification Search ................. 235/386, 235/51

See application file for complete search history.

(56) References Cited

U.S. PATENT DOCUMENTS 5,412,727 A 5/1995 Drexler et al.
5,875,432 A 2/1999 Sehr
6,092,051 A 7/2000 Kilian et al.
6,412,692 B1 7/2002 Miyagawa
6,865,543 B2 3/2005 Gibbs, Sr.
6,873,699 B2 3/2005 Miyauchi
2005/0092835 A1 * 5/2005 Chung et al. ................ 235/386

* cited by examiner

*Primary Examiner*—Karl D. Frech
(74) *Attorney, Agent, or Firm*—J. Wiley Horton

(57) ABSTRACT

A new system for electronic polling. The system employs a plurality of voter check-in stations which display voter identity information and enable poll workers to verify voting eligibility. Each check-in station is connected to the internet by any available means. Periodically, the check-in station sends a block of information to a web site. The block of information includes a list of the registration numbers of all of the voters who have voted and the last time-stamp of information that it has updated onto the local database. The web site responds with a block of information containing a list of voters who have been reported as voting in other areas of the jurisdiction also a list of voters whose status has changed. The check-in station uses this information to update the local database with the voting status and eligibility status of the voters on its database. The voter check-in process runs only against the local database thereby eliminating the reliance on communications with the web site.

27 Claims, 3 Drawing Sheets

ELECTRONIC POLL REGISTER SYSTEM FOR ELECTIONS

FIELD OF THE INVENTION

This invention relates to the field of election polling. More specifically, the invention comprises a method and system for providing voter identity information, recording voter check-in status, and updating a central database system.

DESCRIPTION OF THE RELATED ART

Election polling officials utilize various registry systems in an effort to prevent fraudulent voting behaviors such as "double voting" and "identity fraud." Conventional registry systems, however, are limited in a variety of ways. The registry systems used in many jurisdictions is nothing more than a list of names of individuals who are eligible to vote in a given precinct. In these jurisdictions, an individual is required to produce at least one of the acceptable forms of identification at the individual's designated precinct, and the individual's name is subsequently marked off of the list. These registry systems require the voter to vote only in their precinct and not from other polling locations within the jurisdiction.

After an election the fact that a voter has voted has to be updated on the central database system. Currently this involves processing the paper register, either by scanning the register and automatically recognizing the fact that a voter has signed the register, or by swiping bar codes next to the voter's signature. This process is very labor intensive. Obtaining an accurate cross check between tabulation totals from voting machines and totals of those who have signed the register is labor intensive, uncertain and time consuming.

Furthermore, these systems are especially vulnerable to human error since they are heavily managed by people. For example, occasionally polling operators inadvertently fail to mark an individual's name from the list after the individual has voted or when the voter checks in at the poll. This mistake permits the voter to return to the poll to cast a second vote. Also, a polling operator may inadvertently mark the wrong individual's name from the list. This mistake could cause an individual to lose his or her opportunity to vote.

In addition, many jurisdictions permit "early voting" in an effort to provide individuals with greater opportunity to vote and decrease waiting lines at the polls on the day of the election. Individuals who participate in early voting must also be marked off from voting lists to ensure that they are not able to cast a second vote. This process is similarly vulnerable to human error.

Efforts to "computerize" the process, such as using a central database system, have presented different challenges. For example, the use of a conventional central database system is vulnerable to network availability. Conventional central database systems utilize many remote terminals which communicate with a central database containing a list of all of the registered voters for a jurisdiction. The systems use real-time communication processes so that validation of an individual's voting status requires the remote terminal and central database to be in continuous communication. Disruption of the network could create serious upheaval since the remote terminal could not validate whether an individual is authorized to vote.

Another problem with computerizing the process is that some jurisdictions lack the infrastructure to provide some precincts with the high quality data communication lines necessary to maintain real-time communications with a central database without causing excessive delays in validating a voter's authorization status. This makes the use of a computerized system less desirable because it increases the amount of time it takes for an individual to vote and causes increased waiting lines at the polls.

It would therefore be desirable to provide a voter registry system capable of providing voter identity information, recording voter check-in status, and having a central database which would permit a voter to vote from various voting locations within a jurisdiction. Furthermore, it would be desirable that the voter registry system not be dependent on real-time communication processes to a central database system.

BRIEF SUMMARY OF THE PRESENT INVENTION

The present invention comprises a new system for electronic polling. The system allows real-time verification of voter eligibility status with respect to voting during the designated period before and during Election Day, preventing attempts to vote more than once. The system design requires very low quality data communication lines, and will allow eligible voters to check in and be allowed to vote, even when network availability is intermittent or unavailable.

The system employs a plurality of voter check-in stations which display voter identity information and enable poll workers to verify voting eligibility. Each check-in station is connected to the internet by any available means. Periodically, the check-in station sends a block of information to a web site. The block of information includes a list of the registration numbers of all of the voters who have voted and the last time-stamp of information that it has updated onto the local database. The web site responds with a block of information containing a list of voters who have been reported as voting in other areas of the jurisdiction also a list of voters whose status has changed. The check-in station uses this information to update the local database with the voting status and eligibility status of the voters on its database. The voter check-in process runs only against the local database thereby eliminating the reliance on communications with the web site.

REFERENCE NUMERALS IN THE DRAWINGS

Figure 1:
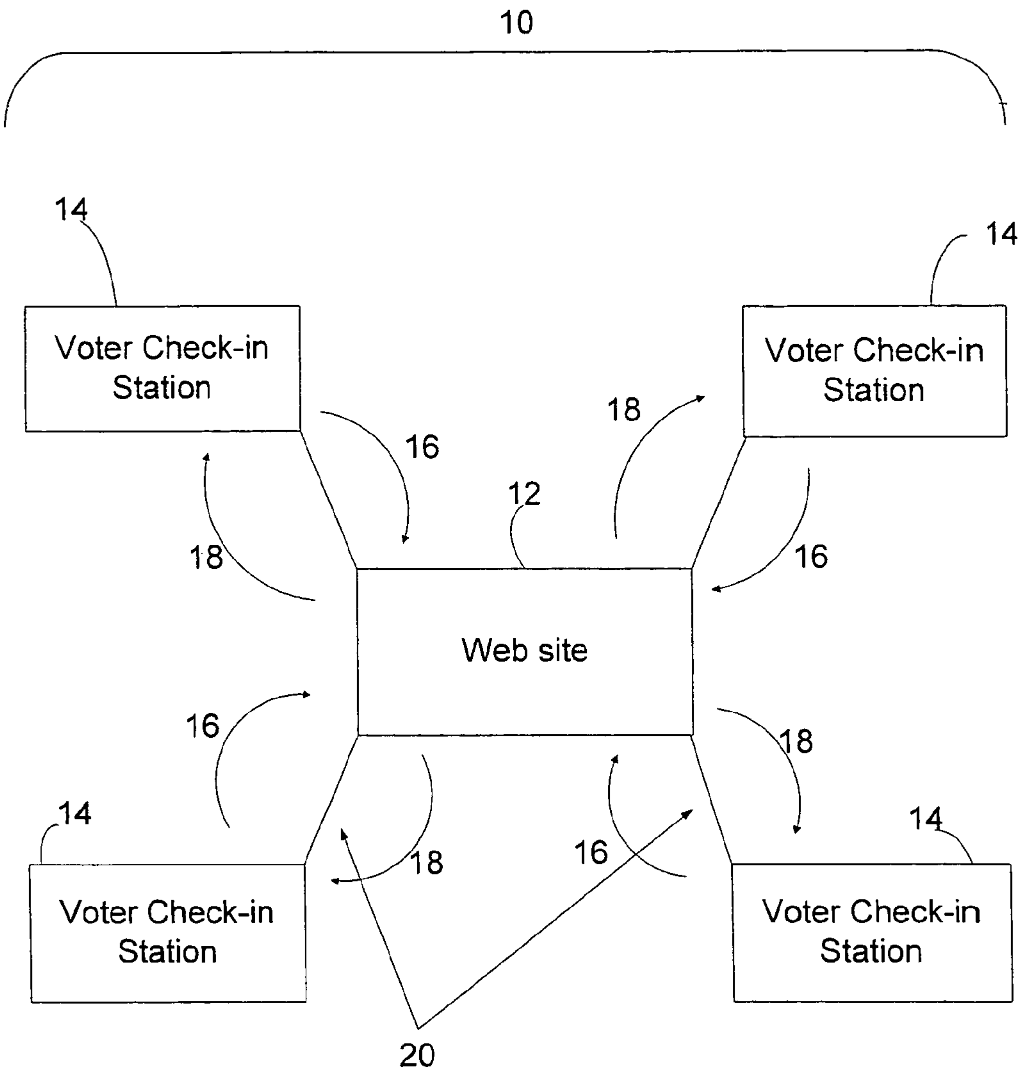
FIG. 1 is a block diagram illustrating a configuration of an electronic poll registers system.

10 electronic poll register system
12 web site
14 voter check-in stations
16 communication pathway
18 communication pathway
20 connection means
22 master station
24 connection means
26 voter check-in stations
28 connection means
30 voting management system
32 communication pathway

34 communication pathway

DETAILED DESCRIPTION OF THE INVENTION

A basic configuration for a preferred embodiment of the present invention, an electronic poll register system, is shown in FIG. 1. Electronic poll register system 10 principally comprises multiple voter check-in stations 14 which are configured for connection to web site 12 by connection means 20. Conceptually, FIG. 1 can represent an electronic poll register system for a single jurisdiction with multiple polling locations, represented by voter check-in stations 14. Accordingly, FIG. 1 could represent a jurisdiction that has four polling locations.

Voter check-in station 14 is a microcomputer that is designed to display voter identity information and enable a poll worker to verify voting eligibility as quickly as possible. It holds in its local database a list of all the voters that are eligible to vote at the voting location, and also carries a list of all voters that are eligible to vote in the jurisdiction served by the voter check-in station. Examples of voter identity information may include the individual's name, voter registration number, and whether the individual is eligible to vote.

When a voter checks in to cast his or her vote, the database on voter check in station 14 is updated with the fact that the voter has checked in to vote. A variety of means can be used for entering changes of voter status to the local database. For example, a poll worker may manually enter the change or swipe an identification card through a magnetic reader, laser scanner, or other scanning device.

Voter check-in stations 14 are connected to the internet and web site 12 by connection means 20. Connection means 20 may include LAN (Local Area Network), dial-in connection using a modem and phone line, wireless connection or other means of connecting data systems known in the art. Periodically, at designated time intervals, voter check-in stations 14 send blocks of information to web site 12 via communication pathway 16. In the preferred embodiment, the blocks of information sent to web site 12 includes the list of all the voters who have voted at voter check-in station 14 and a time-stamp indicating the last time the local database was updated with information provided by web site 12. Using the time stamp provided by voter check-in station 14, web site 12 sends blocks of information to voter check-in station 14 via communication pathway 18. The blocks of information sent via communication pathway 18 may include a list of the voters who have been reported as voting in other areas of the jurisdiction and also a list of voters whose status has changed. Voter check-in station 14 uses this information to update its local database. It stores the time-stamp provided by web site 12 of the last entry so as to provide web site 12 the starting point of retrieval for the next block of information.

Those that are skilled in the art will appreciate that the above described process of information exchange can occur in background mode. The actual check-in process used to determine whether the voter who has checked in is eligible to vote runs only against the local database. This feature allows eligible voters to check-in to vote even if communications with web site 12 have been disrupted. If internet communications to the local database are disrupted then the ability of electronic poll register system 10 to detect "double voting" attempts is lost, but a functioning election system is still in place that is at least as good as election systems prior to electronic voter check in.

In order to simplify the deployment of voter check-in stations 14, each station is configured with identical software. The behavior of voter check-in stations 14 can be controlled by the use of a removable device such as a USB storage device, known as a "jump drive." The information on the jump drive is in two parts. The first is semi-permanent and indicates the identity of the jump drive, the location and voting jurisdiction where the jump drive is to be used, and the kind of voting voter check-in station 14 is to support (such as Election Day voting or Early Voting). The second type of information stored on the jump drive is the starting database containing voter identity information and eligibility for the election. The use of a jump drive allows the actual computers used for voter check-in stations 14 to be distributed ahead of Election Day, and allows the copying of the voter registration information to be delayed to the eve of the Election Day. The jump drives are sent to the polling places with other critical information provided to the poll worker in charge of the voting location.

The jump drive can also be used during production use to hold a "log" of all the activity on a station. In this context, the jump drive serves useful recovery and security functions. In the event that not all activity from the station is successfully reported to web site 12, during Election Day, the jump drives may be processed after the election to retrieve the voting information. Also, if an electronic poll register station fails in service, the jump drive is pulled from the failed machine and placed in the replacement machine. The replacement machine will be able to begin servicing voters within a matter of minutes and be restored to the state of the failed machine before failure.

Furthermore, the jump drive maybe used to carry communications configuration information for a specific location. Communication configuration information can include any information necessary to allow communication between the voter check-in station and web site 12 such as IP addresses, dial-up numbers, and network settings. This allows the electronic poll register station to access the internet via dial out lines or other means, without the need for reconfiguration on Election Day. This means that the user is not required to deliver specifically pre-configured machines to a specific location.

Figure 2:
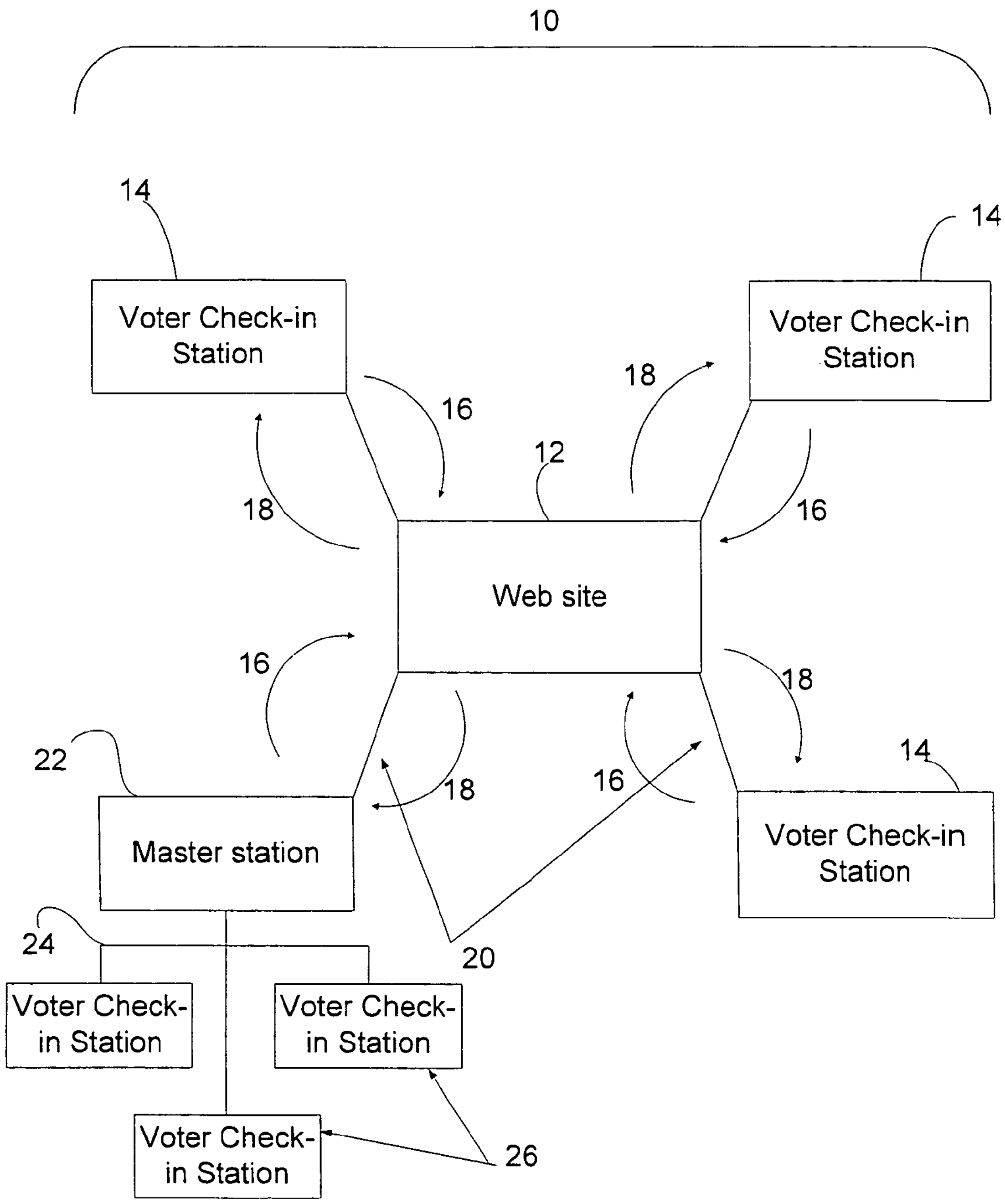
FIG. 2 is a block diagram illustrating a configuration of an electronic poll register system.

A variation of the present invention is shown in FIG. 2. Those that are skilled in the art know that it is sometimes desirable to employ several check-in stations at a single polling location. This can be accomplished by using a single master station 22 to retrieve updates from web site 12, and these updates are provided to voter check-in stations 26 by connection means 24. Connection means 24 represents a local network that allows voter check-in stations 26 to communicate with master station 22. It is understood that the use of master station 22, connection means 24 and voter check-in stations 26 is equivalent to the use of single voter check-in station 14. Those that are skilled in the art will also know that the local database for the polling location can be carried in master station 22 or in each voter check-in station 26.

It is desirable for the entire design to be sufficiently flexible and robust to survive communications breakdown. It is therefore desirable for each station to contain its own copy of the database. Otherwise a failure of master station 22 might take down the entire cluster.

Figure 3:
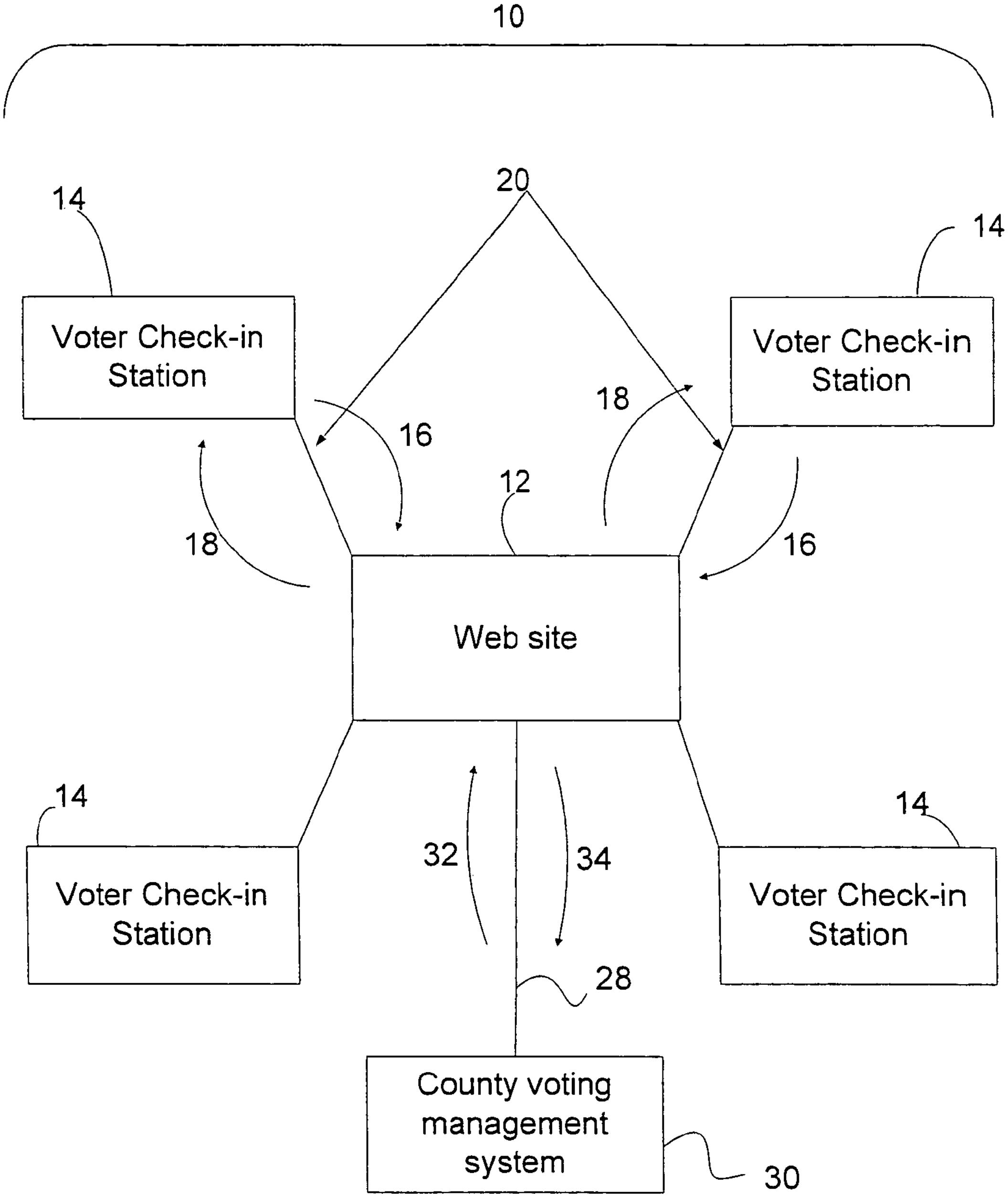
FIG. 3 is a block diagram illustrating a configuration of an electronic poll register system.

FIG. 3 illustrates the present invention used in conjunction with a county system. A "county system" is a term covering voting management system 30 used by the jurisdiction running the election. Voting management system 30 represents the system used by a jurisdiction to update web site 12 with changes to voter information and eligibility. Voting management system 30 sends information to web site 12 via communication pathway 32 and connection means 28 to web site 12. Information sent via communication pathway 32 may include voter changes of address that may impact the place where the voter may vote, or the ballot style the voter may receive; voting activity arising out of processing Absentee Ballot returns; voting activity arising out of Early Voting; changes of eligibility such as moving out of the jurisdiction, or voter decease; and changes of eligibility due to correction of clerical errors in the registration rolls. In addition, voting management system 30 retrieves from web site 12 the registration numbers of all voters that have "checked in" at voter check-in stations 14 and will distribute these back out to all check-in stations within the jurisdiction thus helping to prevent a voter for voting more than once.

Although the above description refers to a "county" system, it should be understood that it can also be used for an entire state or jurisdiction. The example of a county system is merely one example of how the system can be set up for a jurisdiction.

As suggested above, web site 12 contains a database of all the changes that have been made affecting the voter's registration status or voting status. These changes are time-stamped using the webs site systems clock. Voting management system 30 along with one or more of voter check-in stations 14 at each of the voting locations place voter information changes onto web site 12. Voting management system 30 and voter check-in stations 14 retrieve changed voter information for web site 12 thus keeping the main central database and the distributed local databases synchronized with each other. It is further contemplated that web site 12 can provide monitoring service of polling site contacts. A web page can indicate any polling sites that have not contacted the web site for a length of time (such as ten minutes), thus allowing technical support to be sent to voting locations that have stopped reporting voting activity.

Although the preceding descriptions contain significant detail they should not be viewed as limiting the invention but rather as providing examples of the preferred embodiments of the invention. As one example, various configurations can be used for voter check-in stations such as the use of master station 22 connected to voter check-in stations 26 via local network. Changing the configuration of voter check-in station 14, however, does not depart from the spirit and scope of the invention. Accordingly, the scope of the invention should be determined by the following claims, rather than the examples given.

Having described my invention, I claim:

1. An electronic poll register systems comprising:

a. a server associated with a central database;

b. a plurality of voter check-in stations, each of said plurality of voter check-in stations configured to send blocks of voter information to said server at designated time intervals and receive blocks of voter information from said server;

c. wherein each of said plurality of voter check-in stations includes a local database of all the voters that are eligible to vote at the voting location;

d. a communication pathway for allowing communication between said server and said plurality of voter check-in stations; and e. wherein each of said plurality of voter check-in stations is configured to make a voter eligibility determination by performing an eligibility comparison exclusively against said local database.

2. The electronic poll register system of claim 1, wherein each of said plurality of voter check-in stations further comprises a list of all voters that are eligible to vote in the jurisdiction served by said plurality of voter check-in stations.

3. The electronic poll register system of claim 1, wherein each of said plurality of voter check-in stations is further configured to display voter identity information.

4. The electronic poll register system of claim 2, wherein each of said plurality of voter check-in station is further configured to display voter identity information.

5. The electronic poll register system of claim 1, wherein said blocks of voter information sent to said server comprises the registration numbers of all voters who have voted.

6. The electronic poll register system of claim 1, wherein said blocks of voter information sent to said server further comprises a time stamp indicating the time said blocks of information received from said server was last received.

7. The electronic poll register system of claim 1, further comprising a voting management system for updating said central database with changes regarding voter status and voter eligibility.

8. The electronic poll register system of claim 1, further comprising a compact memory device configured to communicate with at least one of said plurality of voter check-in stations, said compact memory device including a database of all the voters that are eligible to vote in the jurisdiction.

9. The electronic poll register system of claim 8, wherein said compact memory device further includes communication configuration information for said at least one of said plurality of voter check-in stations.

10. An electronic poll register system comprising:

a. a central database, b. a local database accessible from a polling location, said local database including voter identity information for all voters eligible to vote in the jurisdiction;

c. wherein changes to said central database are communicated to said local database; and d. wherein changes to said local database are communicated to said central database at designated time intervals along with a time stamp indicating the last time said local database received an update from said central database.

11. The electronic poll register system of claim 10, wherein said local database is stored on a voter check-in station, said voter check-in station configured to display voter identity information.

12. The electronic poll register system of claim 10, wherein said voter identity information includes voter registration numbers and a status identifier indicating whether a voter has voted.

13. The electronic poll register system of claim 10, wherein said local database further comprises a list of all voters eligible to vote in the jurisdiction served by said polling location.

14. The electronic poll register system of claim 10, further comprising a voter management system for updating said central database with changes regarding voter status and voter eligibility.

15. The electronic poll register system of claim 10, wherein said local database is accessible from a voter check-in station.

16. The electronic poll register system of claim 15, wherein said voter check-in station further comprises a means for entering changes in voter status to said local database.

17. The electronic poll register system of claim 15, wherein said voter check-in station is configured to make a voter eligibility determination by performing an eligibility comparison exclusively against said local database.

18. The electronic poll register system of claim 10, wherein said local database is stored on a compact memory device.

19. The electronic poll register system of claim 18, wherein said compact memory device further includes communication configuration information for said at least one of said plurality of voter check-in stations.

20. An electronic poll register system for determining whether a prospective voter is eligible to vote comprising:

a. a server associated with a central database;

b. a plurality of voter check-in stations, said plurality of voter check-in stations configured to send blocks of voter information to said server and receive blocks of voter information from said server in background mode;

c. wherein each of said plurality of voter check-in stations include a local database of all the voters are eligible to vote at the voting location, and said plurality of voter check-in stations further configured to make a determination of whether said prospective voter is eligible to vote at said voter check-in station by performing an eligibility comparison exclusively against said local database associated with said voter check-in station; and d. a communication pathway for enabling communication between said server and said plurality of voter check-in stations.

21. The electronic poll register system of claim 20, wherein each of said plurality of voter check-in stations further comprises a list of all voters that are eligible to vote in the jurisdiction served by said plurality of voter check-in stations.

22. The electronic poll register system of claim 20, further comprising a compact memory device configured to communicate with at least one of said plurality of voter check-in stations, said compact memory device including a database of all the voters that are eligible to vote at the voting location.

23. The electronic poll register system of claim 20, further comprising a compact memory device configured to communicate with at least one of said plurality of voter check-in stations, said compact memory device also configured to maintain a log of activities performed by said at least one of said plurality of voter check-in stations.

24. The electronic poll register system of claim 20, further comprising a compact memory device configured to communicate with at least one of said plurality of voter check-in stations, wherein said compact memory device includes communication configuration information for said at least one of said plurality of voter check-in stations.

25. The electronic poll register system of claim 20, wherein each of said plurality of voter check-in station is further configured to display voter identity information.

26. The electronic poll register system of claim 20, wherein said blocks of voter information sent to said server comprises the registration numbers of all voters who have voted.

27. The electronic poll register system of claim 20, wherein said blocks of voter information sent to said server comprises a time stamp indicating the time said blocks of information received from said server was last received.

* * * * *